(12) United States Patent
Ilijeski

(10) Patent No.: US 12,515,847 B2
(45) Date of Patent: Jan. 6, 2026

(54) PALLETIZED CONTAINER ASSEMBLY WITH MULTI-PURPOSE ADAPTER

(71) Applicant: Shuert Technology, LLC, Sterling Heights, MI (US)

(72) Inventor: Nenad Ilijeski, Macomb, MI (US)

(73) Assignee: Shuert Technology, LLC, Sterling Heights, MI (US)

( * ) Notice: Subject to any disclaimer, the term of this patent is extended or adjusted under 35 U.S.C. 154(b) by 0 days.

(21) Appl. No.: 18/665,610

(22) Filed: May 16, 2024

(65) Prior Publication Data
US 2025/0128855 A1 Apr. 24, 2025

Related U.S. Application Data

(60) Provisional application No. 63/545,417, filed on Oct. 24, 2023.

(51) Int. Cl.
*B65D 19/38* (2006.01)
*B65D 19/18* (2006.01)

(52) U.S. Cl.
CPC ........... *B65D 19/385* (2013.01); *B65D 19/18* (2013.01); *B65D 2519/00034* (2013.01); *B65D 2519/00069* (2013.01); *B65D 2519/00174* (2013.01); *B65D 2519/00208* (2013.01); *B65D 2519/00273* (2013.01); *B65D 2519/00293* (2013.01); *B65D 2519/00318* (2013.01); *B65D 2519/00338* (2013.01); *B65D 2519/00497* (2013.01); *B65D 2519/00537* (2013.01); *B65D 2519/00915* (2013.01); *B65D 2519/00965* (2013.01)

(58) Field of Classification Search
CPC .. B65D 19/385; B65D 19/18; B65D 19/0053; B65D 19/0055; B65D 19/0067; B65D 2519/00024; B65D 2519/00437; B65D 2519/00293; B65D 2519/00323
USPC .......................... 206/599, 386, 600, 503, 512
See application file for complete search history.

(56) References Cited

U.S. PATENT DOCUMENTS

| | | | | |
|---|---|---|---|---|
| 5,722,328 | A * | 3/1998 | Darby | B65D 19/06 |
| | | | | 206/600 |
| RE35,875 | E | 8/1998 | Shuert | |
| 6,024,223 | A * | 2/2000 | Ritter | B65D 19/18 |
| | | | | 206/386 |
| 6,837,377 | B2 | 1/2005 | Shuert | |
| 11,760,538 | B2 * | 9/2023 | Kiolbasa, Jr. | B65D 19/385 |
| | | | | 206/386 |
| 2001/0000712 | A1 * | 5/2001 | Nickell | B65D 88/20 |
| | | | | 206/599 |
| 2009/0241809 | A1 * | 10/2009 | Head | B66C 1/10 |
| | | | | 220/23.91 |
| 2014/0113092 | A1 * | 4/2014 | Doll | B65D 19/385 |
| | | | | 428/36.5 |
| 2015/0083715 | A1 * | 3/2015 | Shuert | B65D 19/18 |
| | | | | 206/599 |

(Continued)

*Primary Examiner* — Rafael A Ortiz
(74) *Attorney, Agent, or Firm* — Young Basile Hanlon & MacFarlane, P.C.

(57) ABSTRACT

A palletized container assembly comprises a pallet base of substantially conventional design, a four-walled sleeve and a pallet adapter providing in one location an interface between the bottom edge of the sleeve and the pallet base and in another location providing a cover for the container assembly by being inverted and placed over the top edge of the container sleeve. Various reinforcement structures can be molded into the pallet adapter.

7 Claims, 13 Drawing Sheets

(56) References Cited

U.S. PATENT DOCUMENTS

| | | | |
|---|---|---|---|
| 2015/0108037 A1* | 4/2015 | Evans | B65D 19/18 |
| | | | 108/50.11 |
| 2016/0264292 A1* | 9/2016 | Schoening | B65D 57/003 |
| 2018/0251259 A1* | 9/2018 | Shuert | B65D 19/18 |
| 2020/0399014 A1* | 12/2020 | Shuert | B65D 19/06 |
| 2021/0078781 A1* | 3/2021 | Spadavecchia | B65D 77/0446 |
| 2024/0317457 A1* | 9/2024 | Hiramine | B65D 19/06 |

* cited by examiner

PALLETIZED CONTAINER ASSEMBLY WITH MULTI-PURPOSE ADAPTER

CROSS-REFERENCE TO RELATED APPLICATION

This application claims priority to Provisional Application Ser. No. 63/545,417 filed Oct. 24, 2023, the entire content of which is incorporated herein by reference.

FIELD OF THE INVENTION

This invention relates to container assemblies and more particularly to a container assembly comprising the combination of a molded plastic pallet, an adapter with a molded-in sleeve track, a four-sided collapsible sleeve and a molded plastic cover.

INTRODUCTION TO THE INVENTION

U.S. Pat. No. 11,542,061 issued Jan. 3, 2023 to Shuert Technology LLC describes a container assembly comprising the combination of a molded plastic pallet having, a four-sided collapsible sleeve and a molded plastic cover. The container can be handled by a forklift and is easily knocked down for storage or return. The sleeve which makes up the container body has multiple external and internal hinges to allow it to be folded flat.

The pallet in that combination is provided with an upwardly opening peripheral track or groove that accepts the bottom edge of the sleeve to join the sleeve to the pallet. Clips may be used to join the component of the assembly together.

Many pallets already in use do not have the peripheral track to receive the sleeve edge. The present innovation addresses this problem by providing an adapter, preferably but not necessarily of molded plastic construction, that fits engagingly on the top of a conventional nine-legged pallet to provide the necessary channel to receive the sleeve edge. In the embodiments described herein, the adapter can play a dual role in that it can serve the purpose of a cover with a peripheral edge fitting over and around the top edge of the sleeve. In addition, the cover can be configured with features on a side opposite the groove to couple with the legs of a pallet in a second container stacked on top of the cover to prevent sliding as between the two stacked container assemblies. The material of construction is non critical and can be HDPE, other polymers or combinations thereof, wood, metal and any of several composites, the key qualities being strength, reasonable rigidity and ability to withstand varying weather and temperature conditions.

Several variations to the basic innovation are here disclosed including varying locations of the adapter channel as well as various reinforcement features to prevent distortion of the adapter and/or the pallet under load due to container content and/or stacking of multiple containers. The terms "channel" and "groove" are used interchangeably herein.

BRIEF DESCRIPTION OF THE DRAWINGS

The various features, advantages and uses of the present apparatus will become more apparent by referring to the following detailed description and drawing in which.

DETAILED DESCRIPTION OF THE ILLUSTRATIVE EMBODIMENTS

Figure 1:
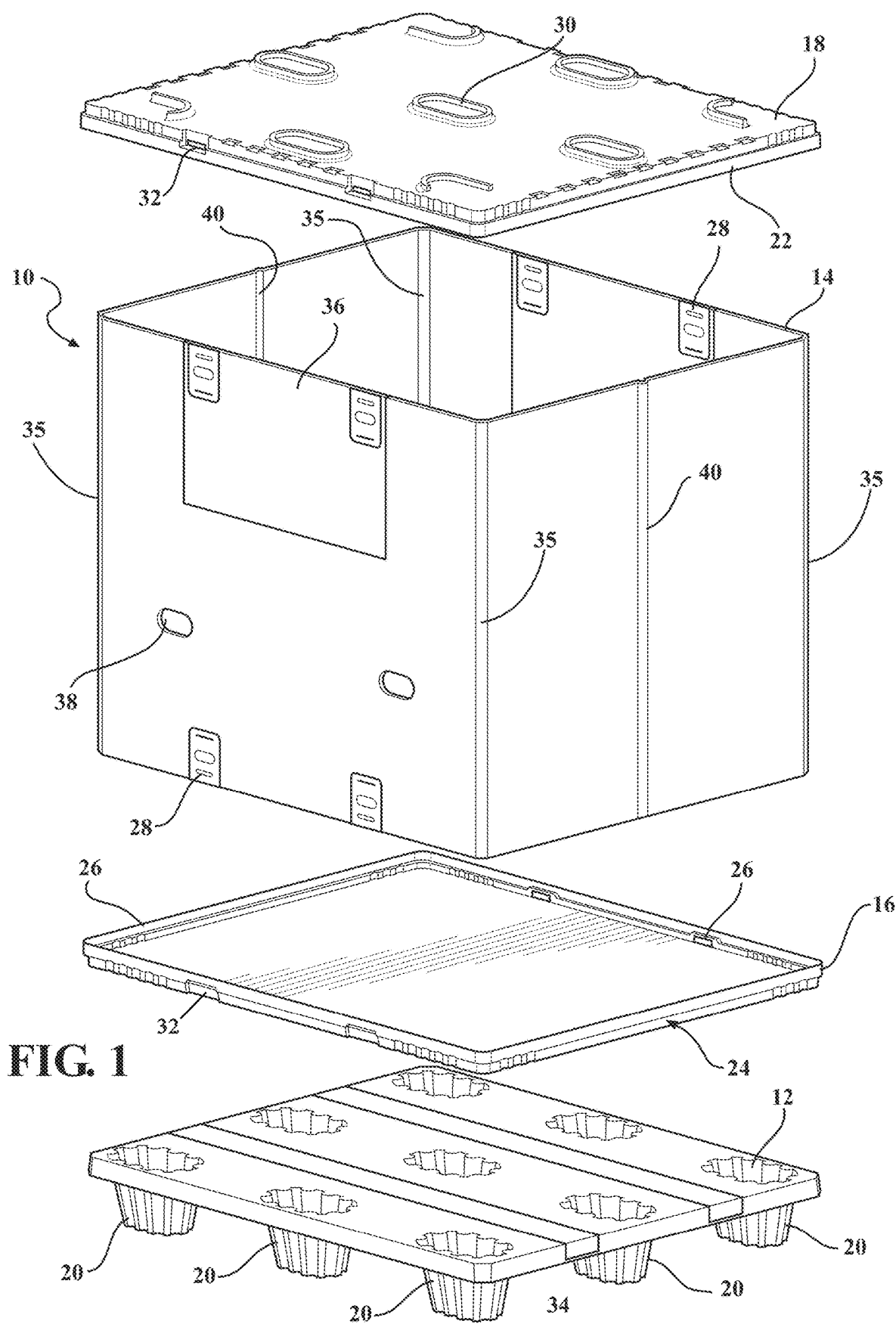
FIG. 1 is exploded view of a container assembly according to the innovative subject matter herein.
Figure 1A:
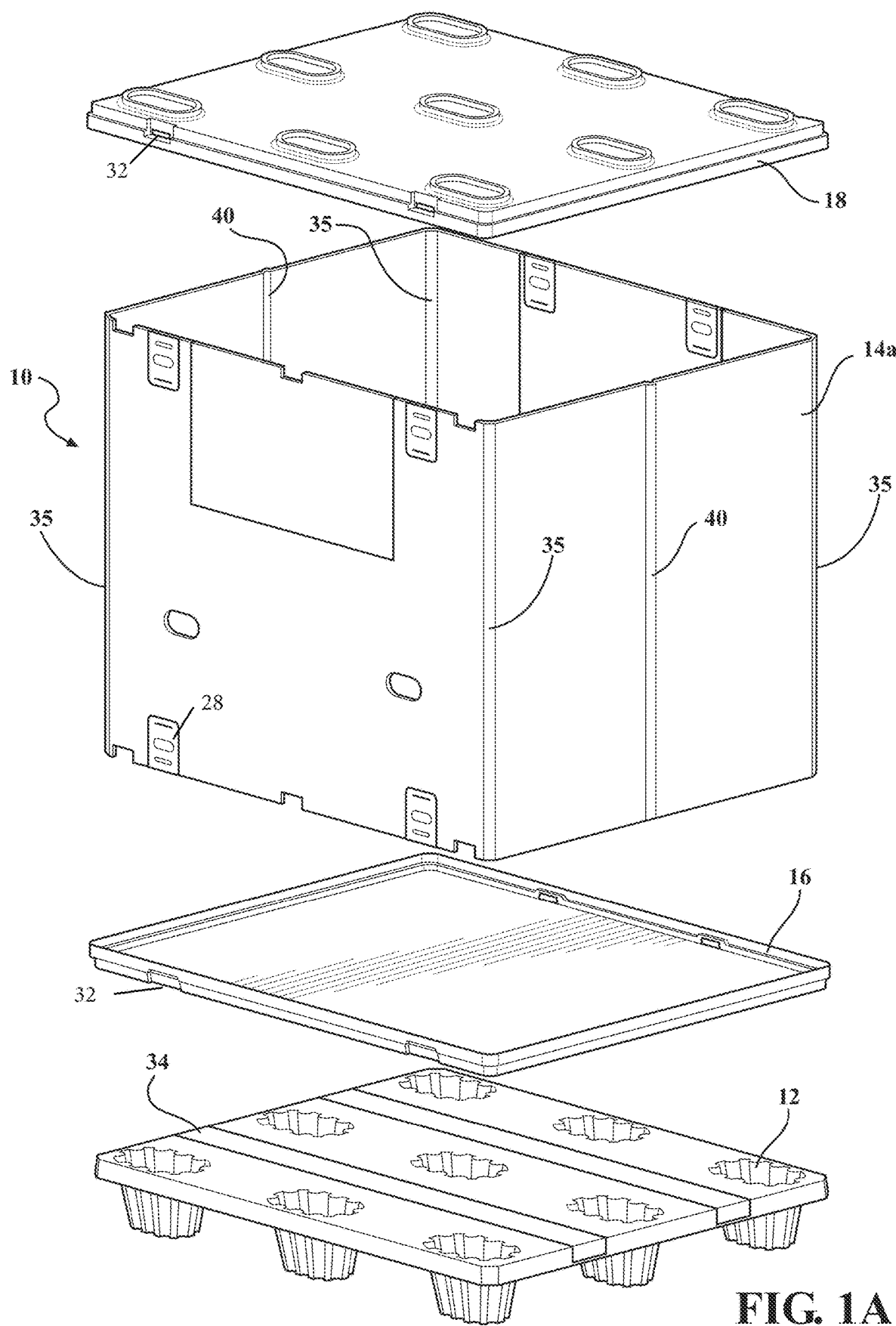
FIG. 1A is another exploded view of a container assembly according to the innovative subject matter herein.

Referring first to FIGS. 1, 1A, 2, 3 and 4 there is shown a container assembly 10 comprising the combination of a molded plastic pallet base 12, a four-walled collapsible sleeve 14 and two identical molded plastic pallet adapters 16 and 18, plate 16 being located between the top surface of the pallet base 12 and the bottom edge of the sleeve 14, while plate 18 is inverted and used as a cover for the container assembly. The top edge of the sleeve 14 fits into the groove 26 in plate 18.

Describing the pallet base 12 in greater detail, it is of essentially conventional configuration and structure in that it has a flat rectangular deck surface and nine integral feet 20 arranged in three rows of three each. The feet 20 open to the deck surface but have closed bottom surfaces (not shown). Moreover, the feet 20 are tapered and may be ribbed for additional strength as desired.

The sleeves 14 and 14A have four vertical walls joined by corner hinges 35 and as shown, is open to the top bottom edges which are continuous. Vertical center hinges 40 are provided on two opposite walls so that the sleeve 14 may be folded flat accordion style for return to a loading destination. An optional hinged door 36 is provided along with oval shaped openings 38 to provide hand holds.

The pallet adapters 16 and 18 respectively shown engaging the bottom and top edges of the sleeve 14 are identical but inverted relative to one another to perform the two separate functions described above. Both pallet adapters 16 and 18 have a continuous groove or track 26 running around all four-sides thereof just inboard of an outer rim 22. Both pallet adapters also have oval-shaped features 30 molded in with inner and outer surfaces on the ungrooved side for purposes to be described.

More specifically, the outer surfaces of features 30 of the pallet adapter 16 shown between the lower edge of the sleeve and the top surface of the pallet base 12 fit into the top openings of the pallet feet 20 for stability; i.e., to prevent lateral and rotational movement of plate 16 relative to the pallet 12. One the other hand, the inner surfaces of the ring features 30 on the pallet adapter 18 acting as a cover receive the bottoms of the feet on an upper pallet base to provide a stabilizing feature in the stacked arrangement of FIG. 3. The ring features are shaped in dimensioned to match the shape and dimensions of the pallet feet and those shapes and dimension may vary; for example, the pallet feet and ring elements 30 may be round, rectangular or square, as long as they match one another. The rings may be partial as shown. In addition, it is not necessary that the number of structures 30 be the same as the number of pallet feet as long as they achieve the desired functions of stability. The features 30 can vary in number and shape beyond what is indicated in the drawings. Overall, their purpose is to prevent lateral and rotational movement between the adaptor plates and the pallets with which they are in contact in the assembled and stacked relationships.

It is apparent in FIG. 1 that the pallet base 12, be of essentially conventional structure and design except for the presence of the optional reinforcement beams 34, i.e., the pallet does not have an upwardly opening groove to receive the bottom of the sleeve 14. Instead, the pallet adapter 16 which rests on top of the pallet base 12 provides a continuous four-side groove 26 to receive the continuous bottom edge of the sleeve 14.

As described in our aforementioned U.S. Pat. No. 11,542, 061, plastic clips 29 described in more detail in that patent are used to provide "locking" connections between the sleeve 14 and slots 32 which are formed in the pallet adapter as desired. Accordingly, the pallet adapter 16/18 not only provide an engagement feature between a container sleeve 14 and a conventional ungrooved pallet base but also serve as a cover having a stabilization feature for a second container assembly stacked upon the first. Again, the pallet adapters 16 and 18 at the lower location and the upper location respectively, are identical and interchangeable.

Figure 3:
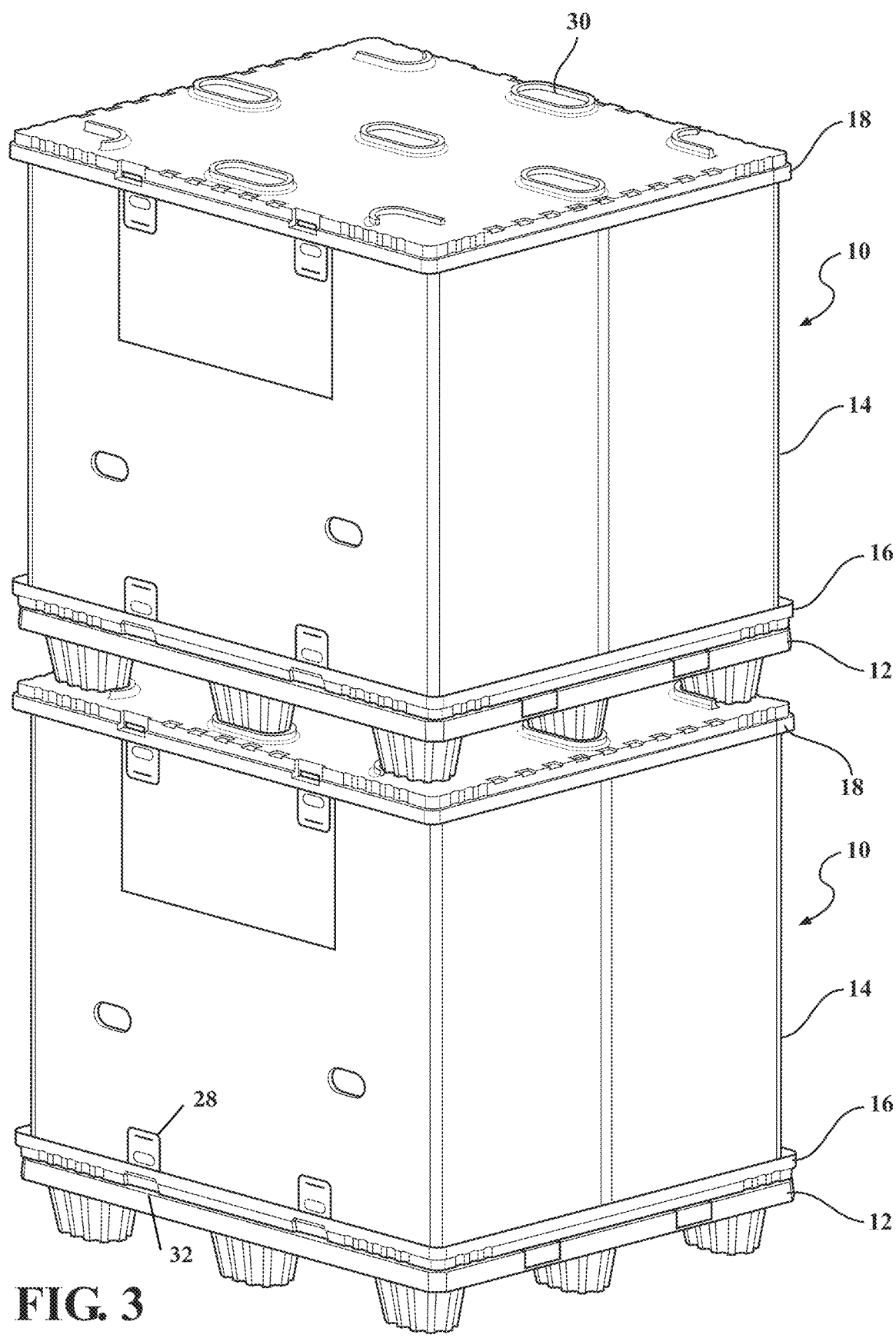
FIG. 3 shows two container assemblies of the type shown in FIG. 2 stacked one atop the other.
Figure 4:
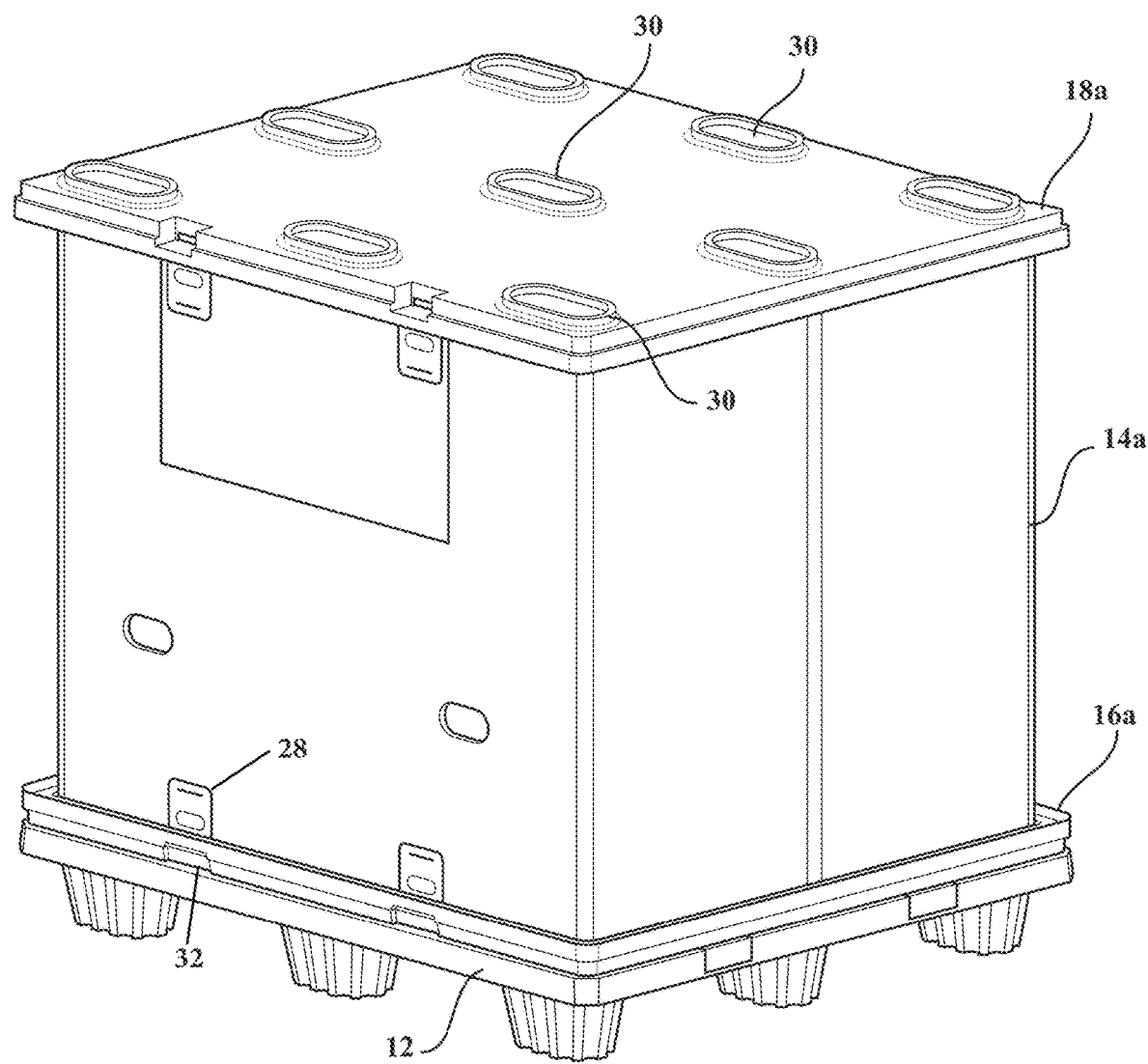
FIG. 4 shows a container assembly with a modification to the location of the groove making the connection between the sleeve and the pallet adapter.
Figure 5A:
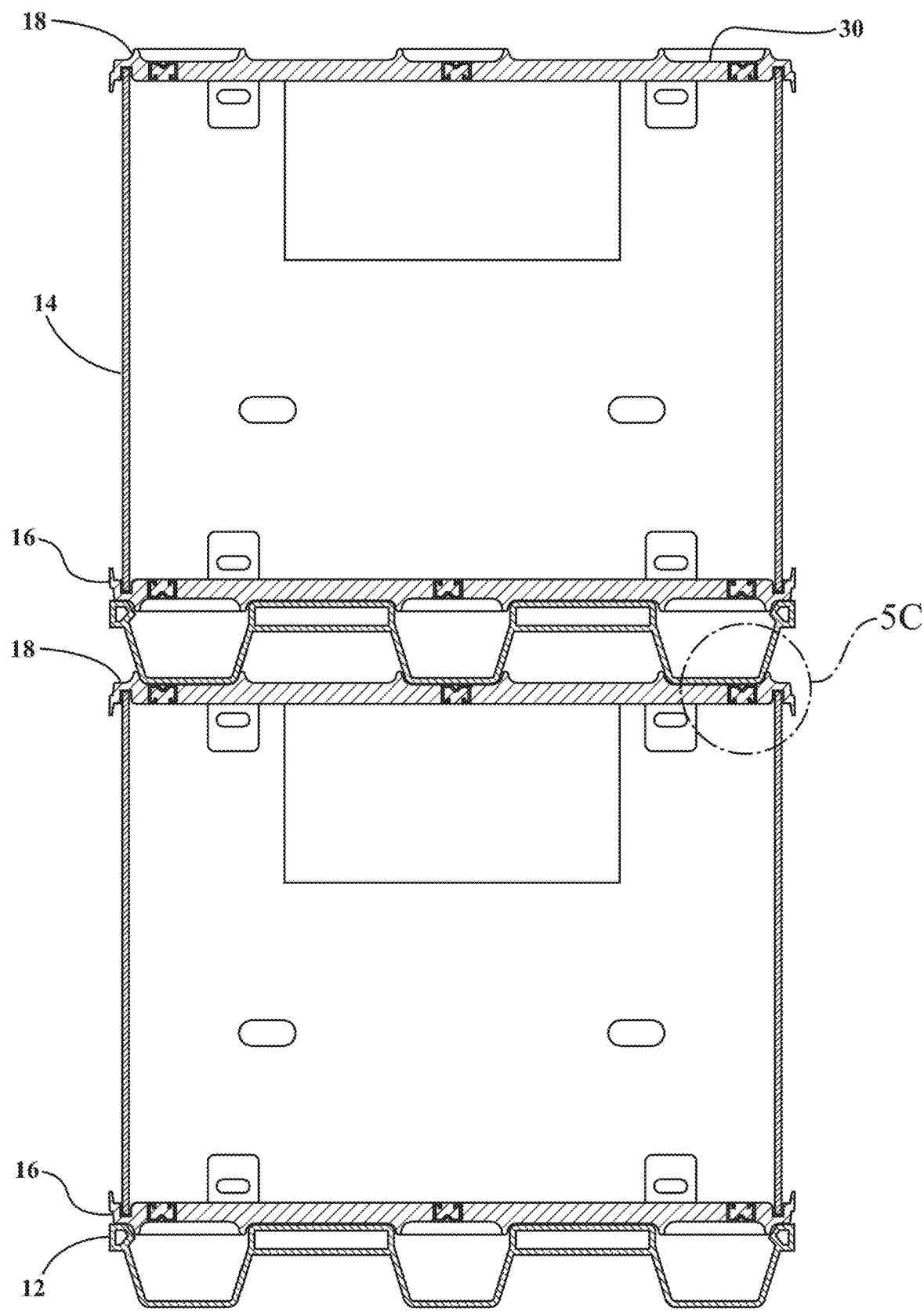
FIG. 5A is front view of two container assemblies stacked upon one another with a reinforcement feature in the pallet adapter.
Figure 5B:
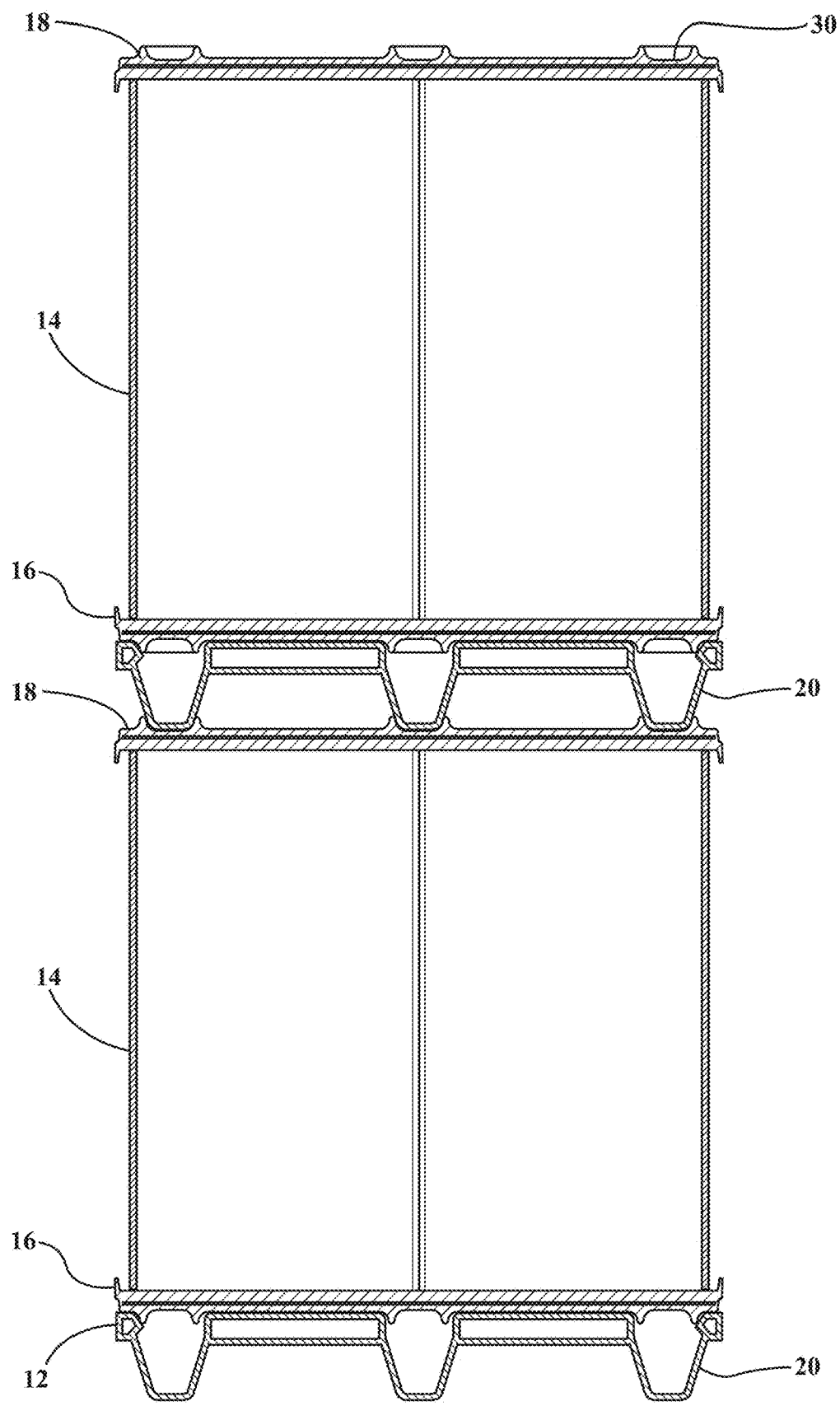
FIG. 5B shows the two container assemblies of FIG. 5A stacked upon one another from the side.
Figure 6C:
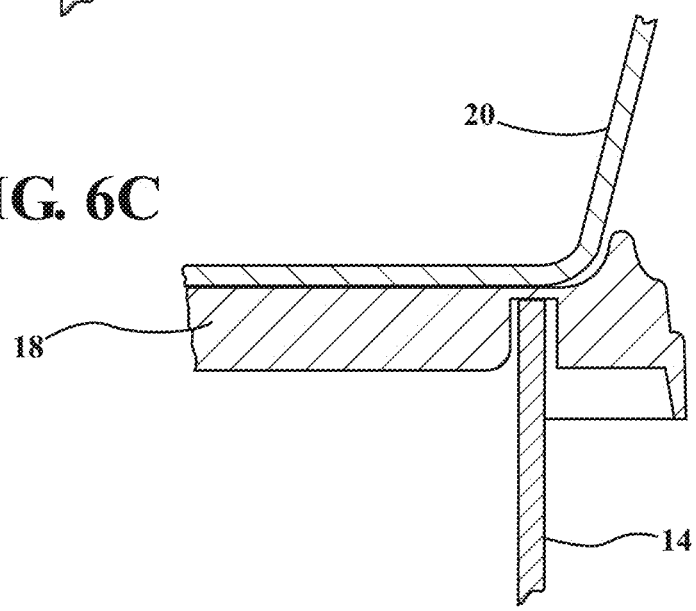
FIG. 6C shows a detail of the manner in which an upper pallet engages the pallet adapter of a lower assembly when used as a cover.
Figure 7C:
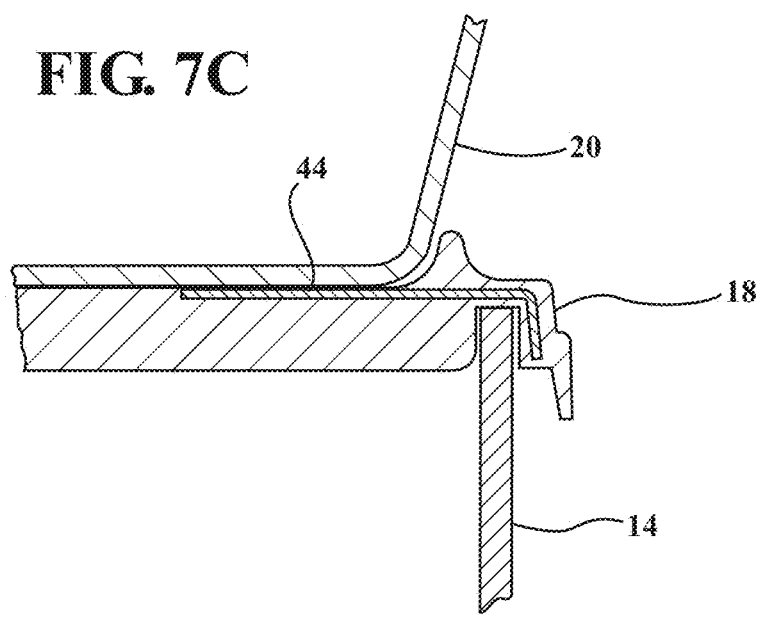
FIG. 7C shows an enlarged detail of a reinforcement plate molded into an pallet adapter used as a cover.
Figure 6A:
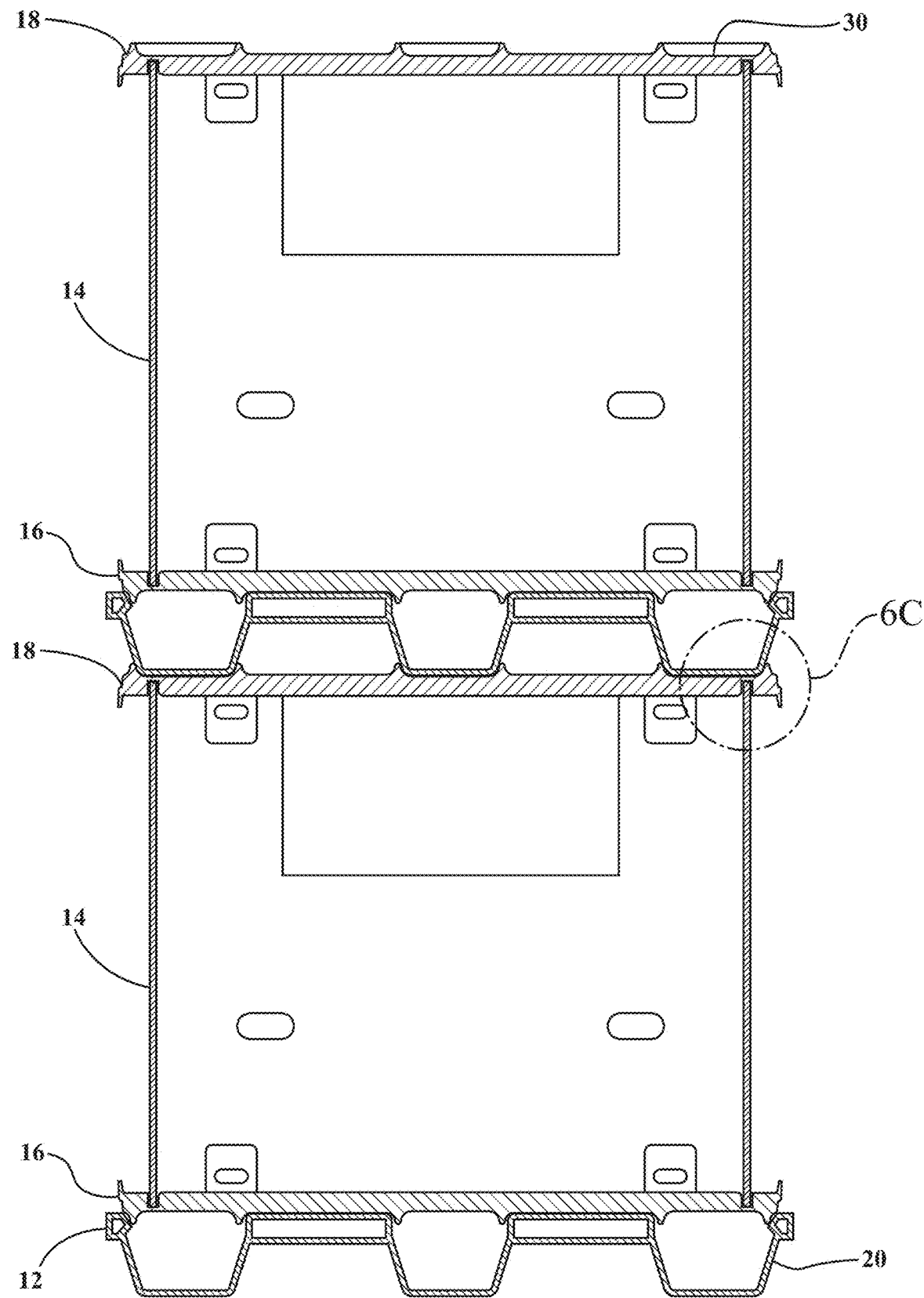
FIG. 6A shows two stacked container assemblies from the front.
Figure 6B:
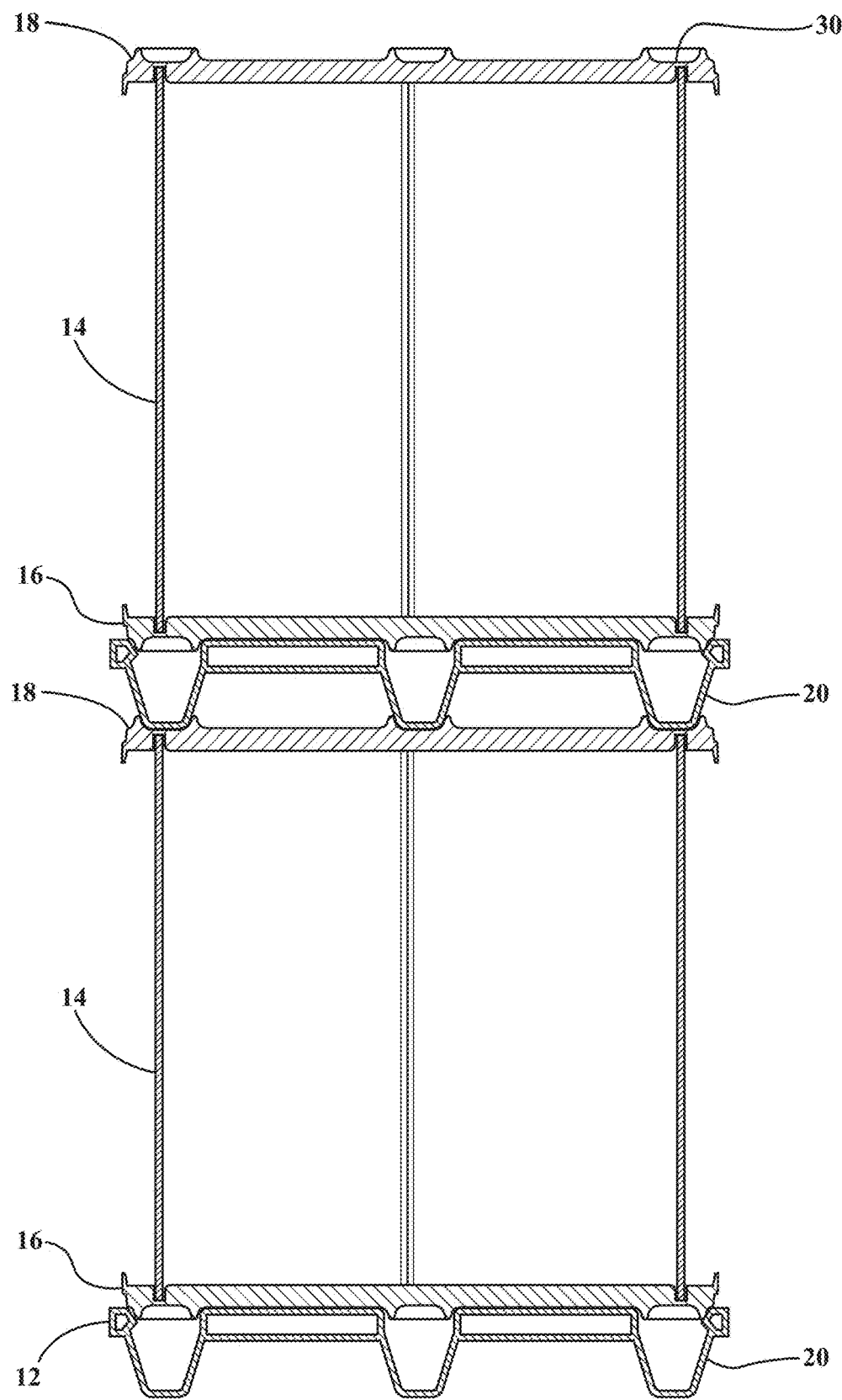
FIG. 6B shows the two container assemblies of FIG. 6A from the side.
Figure 7A:
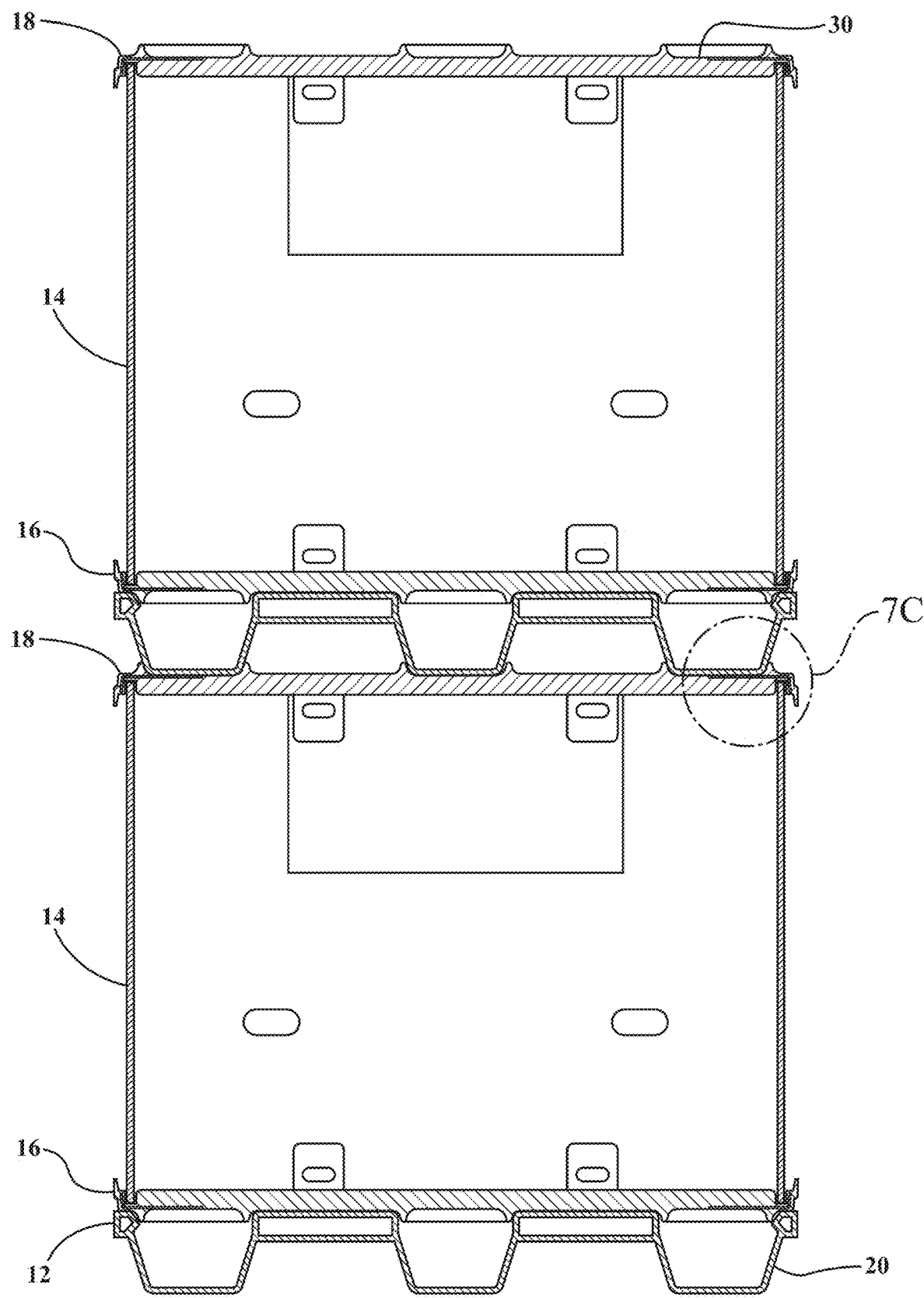
FIG. 7A shows another set of container assemblies stacked upon one another in a front view.
Figure 7B:
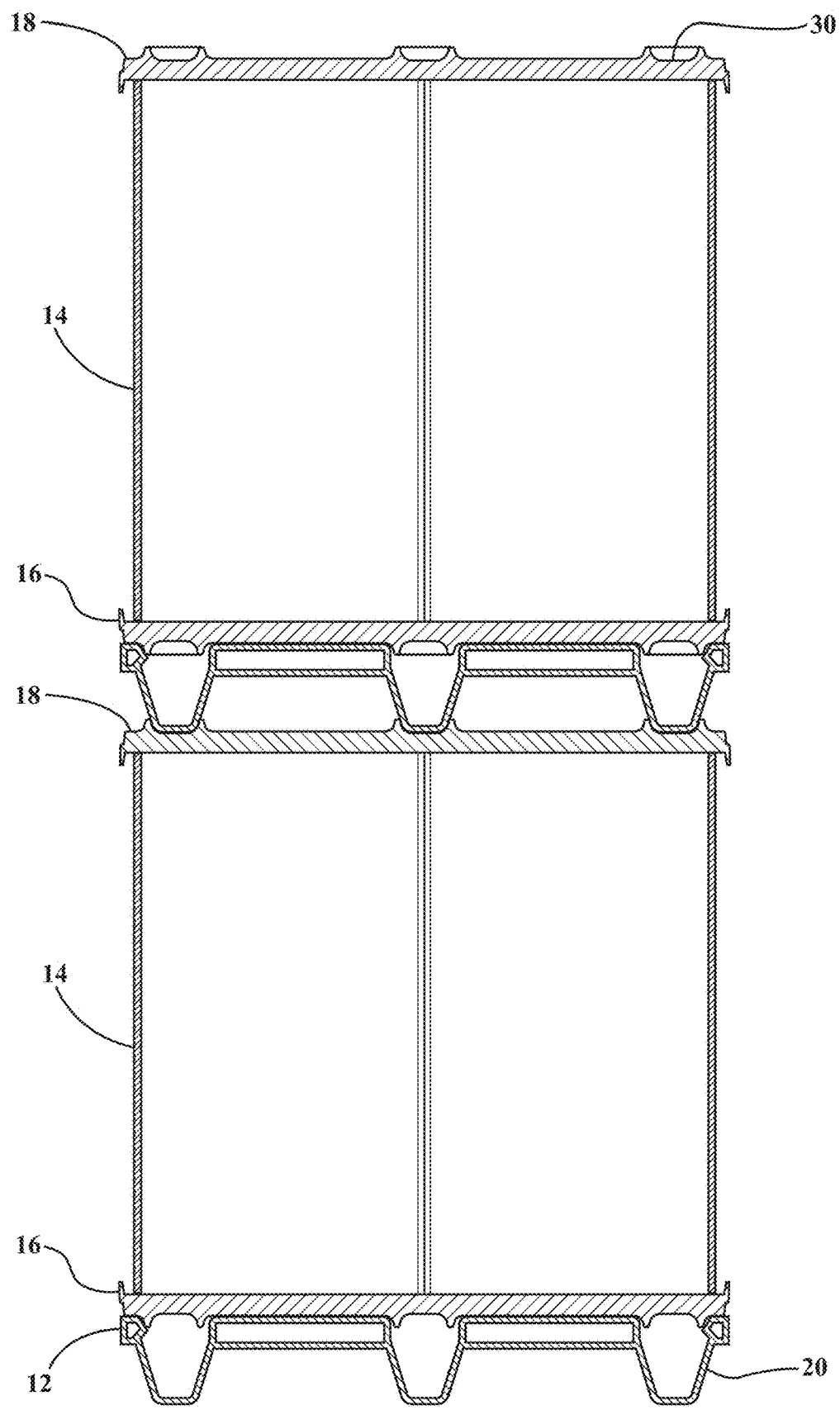
FIG. 7B is a side view of the container assemblies from FIG. 7A.

Turning now to FIG. 4, the container assembly 10a shown there also comprises the combination of a pallet base 12, a sleeve 14a and two pallet adapter 16a and 18a, the lowermost of which is located with a groove facing up to receive the bottom edge of the container sleeve 14a while the uppermost pallet adapter 18a serves as a cover on top of the sleeve 14a. it will be noted that the upper most pallet adapter 18a also shows the features 30 to provide stability in a stacked combinations as shown by way of examples in FIGS. 3, 5A and 6A as well as FIGS. 5B and 6B.

Figure 2:
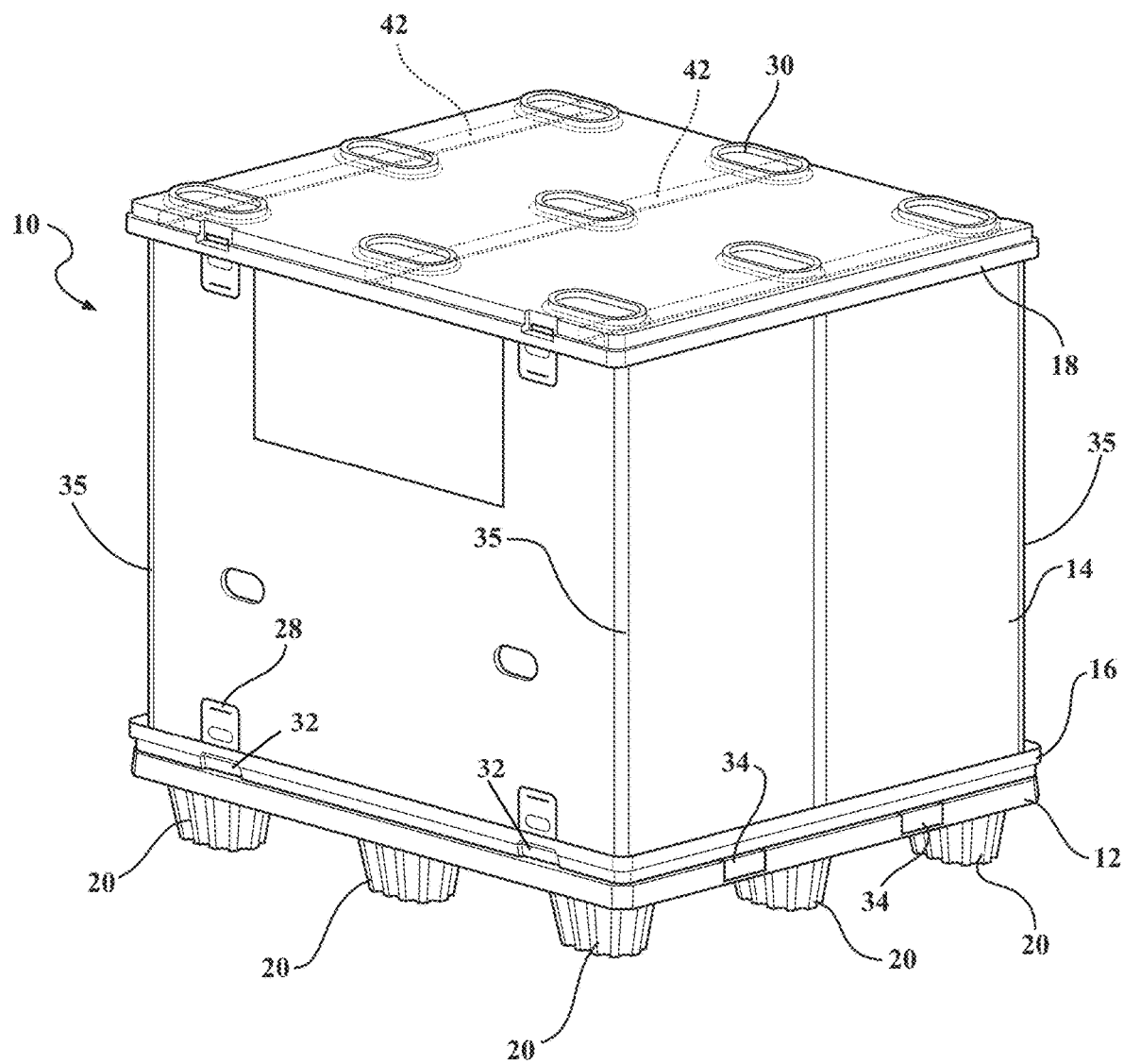
FIG. 2 shows the container assembly of FIG. 1 in the fully assembled state.

The primary difference between the structures shown in FIGS. 2 and 4 is the relocation of the groove in the pallet adapter 16a to a more inboard location to accept the bottom edge of a sleeve of slightly smaller lateral dimensions. This relocation results in less bending force on the outer areas of the pallet base.

Figure 5C:
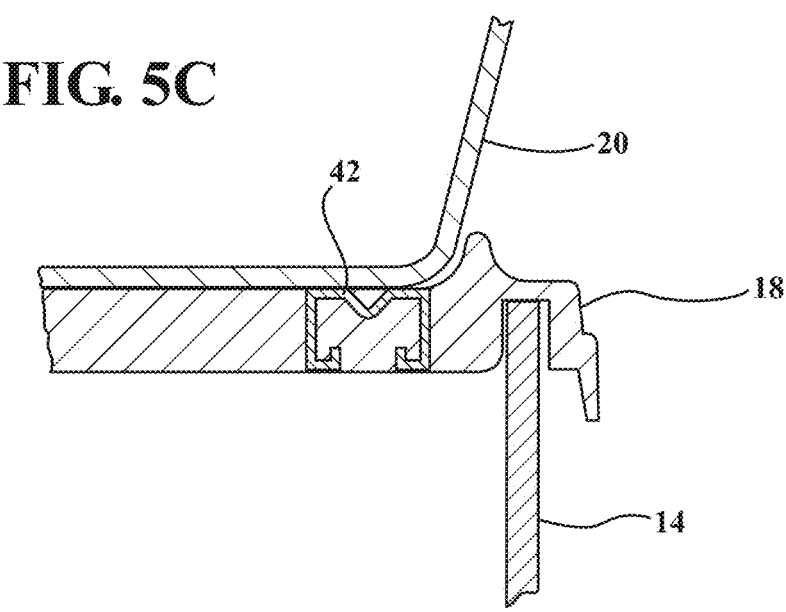
FIG. 5C is a detail from the container assembly of FIG. 5A and 5B illustrating a reinforcement beam having an M configuration.

FIGS. 5A and 5C shows two container assemblies 10 stacked upon one the other wherein the pallet adapter 16 are modified to receive three M-shaped reinforcement beams 42 which are molded into the pallet adapter in three parallel locations in FIGS. 5A and 5C. FIG. 5A shows the stacked container assemblies 10 from the front while FIG. 5B shows the stacked container assemblies from the side. It is apparent that the assemblies are rectangular, but this is not a critical characteristic; i.e., they may be square or even rounded.

FIGS. 6A and 6B are similar but show the pallet adapter without the reinforcement feature; see also FIG. 6C where the foot 20 of an upper most pallet is shown engaged into an edge feature on the pallet adapter 16 serving as a cover when mounted on the wall of the sleeve 14. It will be noted that the feet of the upper pallet 12 fit into the oval ring features 30 of the cover plate 18. FIG. 6B shows how relocating the sleeve more inwardly places the sleeve edge over the feet of the pallets and transmits load forces from the upper container in the stack down through the pallet feet to the ground thereby eliminating the tendency of the load forces to bend the outer peripheral areas of the lower pallet.

Figure 8:
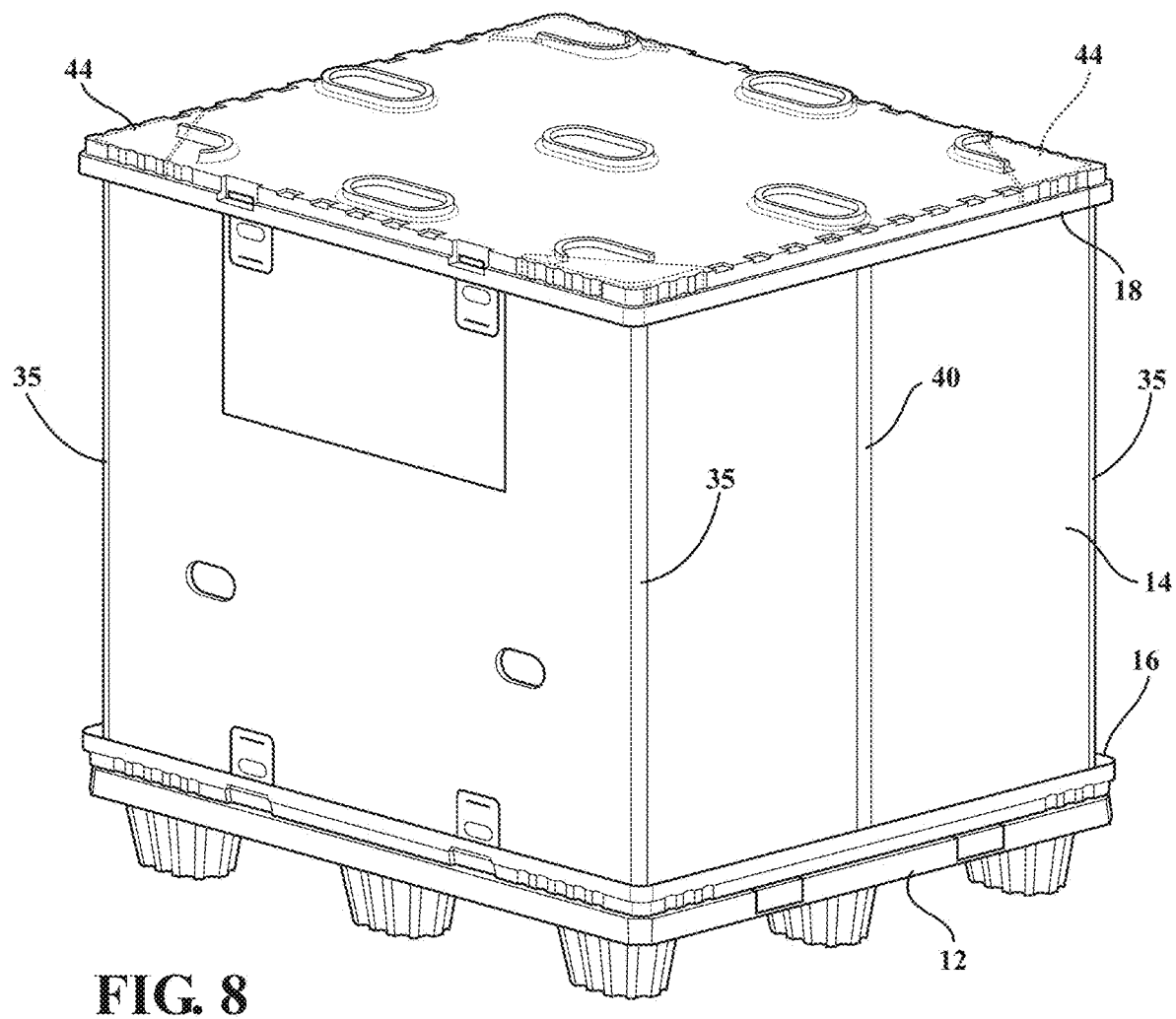
FIG. 8 shows a container assembly fully incorporating the pallet adapter.
Figure 9:
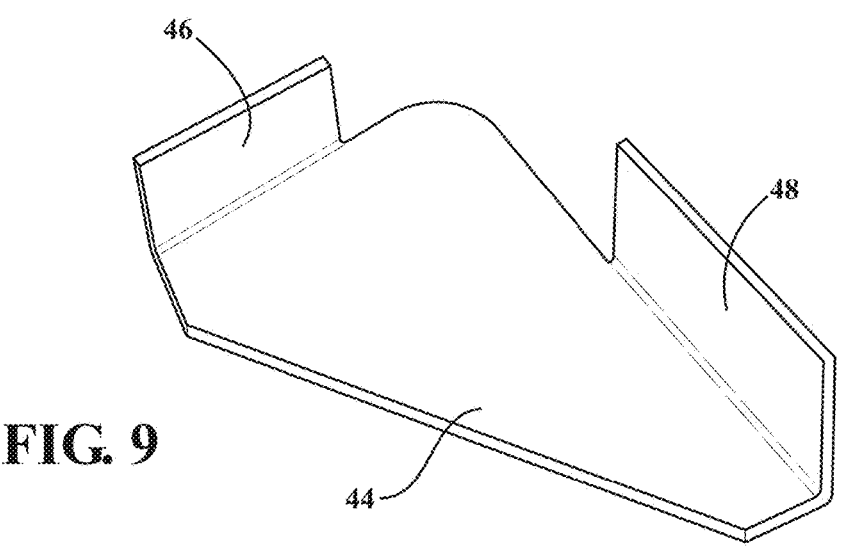
FIG. 9 is a perspective view of the reinforcement plate which is molded into the corners of the pallet adapter shown in FIGS. 7A-7C.

Looking now to FIGS. 8 and 9, a steel reinforcement plate 44 of essentially triangular shape is molded into the corners of the pallet adapter 16/18 to provide added strength and resistance to bending when the container structure is loaded and/or stacked upon one another. The reinforcement plates 44 are substituted for the beam type reinforcement structures 42 shown in FIG. 5C. The steel reinforcement plates 44 have a triangular body as well as edge flanges 46 and 48 which lie along or adjacent to the outside edge surfaces of the pallet adapter 16 as best shown in FIG. 8.

By way of review and summary, the innovation described herein comprises a tray like pallet adapter which allows a conventional pallet to be used in constructing a sleeve type container wherein the pallet adapter is useful not only for an assembly adapter but also as a cover. The pallet adapter provides a further feature in the presence of oval shaped molded-in features 30 on one surface which receive and stabilize the feet of a stacked container pallet to provide anti-slide and anti-rotation stabilization when used both as adaptor and cover. Other innovations disclosed herein include various types of reinforcement structures molded into the pallet adapter to resist bending forces.

Still further, features include various location of the open groove in the pallet adapter to modify the location of the sleeve edge receiving groove toward a more inward location also to resist bending deformation of the molded plastic structures. Although described with reference to specific and detailed embodiment it will be understood that various revisions in dimensions and configurations will be apparent with those skilled in the art and lay within the scope of the innovation disclosed herein.

What is claimed:
1. A palletized container assembly comprising:
    a conventional molded plastic pallet base having a deck with a flat upper surface and a plurality of hollow tapered feet integral with and opening to said deck surface;
    an open-ended sleeve having top and bottom edges and a number of interconnected walls coinciding with the number of sides on said pallet base;
    a adapter plate separate from said pallet for providing said pallet base with structure to be joined to said sleeve, said adapter plate being sized and configured to rest upon and over said deck surface;
    said adapter plate having an upwardly opening peripheral groove formed therein-a configuration and location to receive therein the bottom edge of said sleeve; and
    said adapter plate having oval shaped ring features formed on the surface opposite said groove opening and sized to fit contactingly into said hollow pallet feet to prevent lateral sliding of the adapter plate relative to deck surface.

2. The container assembly as defined in claim 1 wherein the pallet base is rectangular and the sleeve has four walls wherein some of said walls have apertures formed therein adjacent lower edges.

3. The container assembly as defined in claim 2 wherein the sleeve is collapsible.

4. The container assembly as defined in claim 2 further including clip means fixedly attached to said sleeve proximate said bottom edge and configured to fit into said groove in said pallet adapter plate.

5. The container assembly as defined in claim 1 wherein each of the pallet adapter plates have a peripheral rim configured and sized to fit around the edges of said sleeve.

6. The container assembly as defined in claim 1 further comprising a second pallet adapter plate identical to the first pallet adapter plate joined in inverted orientation to the top edge of said sleeve to act as a cover wherein a top edge of said sleeve fits into said groove.

7. The container assembly defined in claim 1 further including reinforcing means molded into said pallet adapter plate.

* * * * *